United States Patent [19]

McCullough, Jr. et al.

[11] Patent Number: 4,898,783

[45] Date of Patent: * Feb. 6, 1990

[54] SOUND AND THERMAL INSULATION

[75] Inventors: Francis P. McCullough, Jr., Lake Jackson; Robert L. Hotchkiss, Midland; R. Vernon Snelgrove, Freeport, all of Tex.; David M. Hall, Auburn, Ala.; Jacqueline R. McCullough, Lake Jackson, Tex.

[73] Assignee: The Dow Chemical Company, Midland, Mich.

[ * ] Notice: The portion of the term of this patent subsequent to Jun. 6, 2006 has been disclaimed.

[21] Appl. No.: 108,255

[22] Filed: Oct. 13, 1987

Related U.S. Application Data

[63] Continuation-in-part of Ser. No. 918,738, Oct. 14, 1986, abandoned.

[51] Int. Cl.[4] .......................... B32B 9/00; B32B 5/02; B64C 1/40

[52] U.S. Cl. .................................... 428/408; 428/222; 428/280; 428/284; 428/902; 428/920; 244/1 N; 244/133

[58] Field of Search ............... 428/408, 222, 280, 367, 428/371, 902, 906, 920, 369, 280; 423/447.1, 447.2, 447.4, 447.6; 264/29.2

[56] References Cited

U.S. PATENT DOCUMENTS

| | | | |
|---|---|---|---|
| 4,631,118 | 12/1986 | McCullough et al. | 204/16 |
| 4,643,932 | 2/1987 | McCullough, Jr. et al. | 428/97 |
| 4,756,941 | 7/1988 | McCullough et al. | 428/367 X |

FOREIGN PATENT DOCUMENTS

| | | | |
|---|---|---|---|
| 8605110 | 10/1986 | PCT Int'l Appl. | 264/29.2 |
| 8802695 | 4/1988 | PCT Int'l Appl. | 428/408 |

*Primary Examiner*—Ellis P. Robinson
*Assistant Examiner*—Susan S. Rucker
*Attorney, Agent, or Firm*—John Lezdey; Joe R. Prieto

[57] ABSTRACT

A thermal insulating and/or sound absorbing structure comprising a batting of resilient, elongatable, non-flammable non-linear carbonaceous fibers, said fibers having a reversible deflection ratio of greater than 1.2:1, an aspect ratio greater than 10:1 and an LOI value greater than 40.

26 Claims, 2 Drawing Sheets

SOUND AND THERMAL INSULATION

CROSS REFERENCE TO RELATED APPLICATIONS

This application is a continuation-in-part of Application Ser. No. 918,738 filed Oct. 14, 1986,entitled THERMAL INSULATION of McCullough, et al, now abandoned.

FIELD OF THE INVENTION

The present invention relates to non-flammable thermal insulation material having a high degree of thermal insulation quality at a low bulk density which also possesses excellent sound attenuating and dampening properties. More particularly, the invention is concerned with resilient shape reforming lightweight non-flammable structures of carbonaceous materials having low heat conductivity, excellent thermal insulation and/or sound absorbing properties. The structures are further characterized by having good shape and volume retention that are stable to numerous compression and unloading cycles.

BACKGROUND OF THE INVENTION

Advanced thermal protection materials will have to meet demands for an acceptable environment. Smoke toxicity, outgassing, dust and other irritants are a problem not only for humans but also for equipment.

Current thermal protection materials in aircraft passenger cabins are a major problem because most common thermoplastic materials are unacceptable because they are flammable, and can generate toxic fumes. For application in spacecraft, satellites, and military aircraft, smoke generation or outgassing may contaminate optical surfaces or react chemically with machine components. These pollutants can be controlled in part by the selection of fibers, coatings, and proper pre- or post-treatments to minimize outgassing. Most applications for advanced aircraft require quantitative limits for volatile materials. Highly crystalline, fully cross linked or thermosetting polymeric materials have been used where relatively inert behavior is required. However, such materials are still flammable.

The prior art has used asbestos, glass wool, polyester and polypropylene fibers, carbon and graphite short straight staple felts, fowl down an various foam materials such as polyurethane foam as thermal insulation for many applications. While asbestos, carbon and graphite felts and fiber glass are considered non-flammable, the other aforementioned thermal insulating materials are considered flammable. The bulk densities of some of the well known thermal insulating materials are in the range of 0.35 to 2 pounds per cubic foot (5.6 -32.04 kg/m$^3$) for insulating materials useful at temperatures not exceeding 120 degrees C. to 2–5 plus pounds per cubic foot for the high temperature insulating materials. Even the newest "light weight" insulating material recently disclosed by NASA consisting of a ceramic from which a carbonaceous material has been burned out, has a bulk density of about 2–6 pounds per cubic foot (32–96 kg/m$^3$). In addition many of the thermal light weight thermal insulation material which is a blend of spun and drawn, crimped, staple, synthetic polymeric microfibers having a diameter of from 3 to 12 microns, and synthetic polymeric staple microfibers having a diameter of more than 12 and up to 50 microns. However, the insulation material is not fireproof and does not provide good sound absorbing properties.

U.S. Pat. No. 4,167,604 to William E. Aldrich discloses the use of crimped hollow polyester filaments in a blend with down in the form of a multiple ply carded web which is treated with a thermosetting resin to form a bat having thermal insulating characteristics. The web, however, does not have fireproof characteristics and is not a good sound absorbent.

U.S. Pat. No. 4,321,154 to Francois Ledru relates to high temperature thermal insulation material comprising insulating mineral fibers and pyrolytic carbon. To make the insulation light weight an expanding agent is utilized or hollow particles such as microspheres are utilized.

U.S. Pat. No. 4,193,252 to Shepherd, et al. discloses the preparation of partially carbonized, graphite and carbon fibers from rayon which has been knitted into a fabric assembly. When the fabric is deknitted, the partially carbonized and the carbonized fibers contain kinks. The fully carbonized or graphite fibers have kinks which are more permanent in nature. Applicants have found that partially carbonized rayon fibers do not retain their reversible deflection and lose their kinks at relatively low temperatures or under tension. The fully carbonized or graphite yarn which is prepared from rayon is brittle and difficult to handle when deknitting. Moreover, carbon fibers produced from rayon are known to possess high water absorption and lower thermal conductivity than fibers with a higher graphite content, such as fibers prepared from acrylic fibers.

SUMMARY OF THE INVENTION

In accordance with the present invention there is provided a light weight, non-flammable structure composed of a multiplicity of non-linear carbonaceous materials which possess both excellent thermal insulation and/or sound absorbing properties. More particularly, the present invention is concerned with a structure comprising a multiplicity of resilient carbonaceous or carbon fibers having a sinusoidal or coil-like shape, a reversible deflection of at least about 1.2:1 and an aspect ratio (l/d) greater than 10:1. Preferably, the structures have a bulk density of about 0.15–0.5 lb/ft$^3$ (2.4–8.0 kg/m$^3$) or less.

The present invention is specifically concerned with structures comprising a multiplicity of nonflammable non-linear carbonaceous or carbon filaments containing at least 65% carbon such as described in copending application Ser. No. 856,305 which are particularly identified by the degree of carbonization and/or their degree of electrical conductivity in the determination of the particular use for which they are most suited.

In accordance with one embodiment of the invention, the non-linear carbonaceous filaments which are utilized in the thermal insulating and/or sound absorbing structures of the invention are non-electrically conductive filaments which are formed by the partial carbonization of stabilized acrylic fiber or fabric or some other stabilized carbon fiber precursor under conditions to impart a sinusoidal and/or a coil-like configuration as will be hereinafter described. The filaments are further characterized by their wool-like fluffy appearance and texture when formed into non-woven mats or batting. As will become apparent, the greater the amount of coil-like filaments present in the structure, the greater will be the wool-like texture and resiliency. The fibers may be blended with non-carbonaceous fibers or carbonaceous linear fibers.

The term non-conductive as utilized in the present application relates to a resistance of greater than $10^7$ ohms. per inch on a 6K tow formed from fibers having a diameter of 7–12 microns. When the precursor fiber is an acrylic fiber, it has been found that a nitrogen content of 18.8% or more results in a non-conductive fiber.

In accordance with a second embodiment of the invention, the non-linear carbonaceous filaments which are utilized in the structures of the invention comprise carbonaceous filaments having a low degree of electrical conductivity and a carbon content of less than 85%. Preferably, the carbonaceous fibers are derived from oxidized acrylic fibers and possess a percent nitrogen content from about 10–35%, most preferably from about 20–25%. The larger the amount of carbon content of the fibers utilized, the higher the degree of electrical conductivity. These high carbon filaments still retain a wool-like appearance when formed into a mat or a batting especially when the majority of the fibers are coil-like. Also, as will become apparent, the greater the percentage of coil-like fibers in the structure, the greater is the resiliency of the structure. As a result of the greater carbon content, the structures prepared with these filaments have greater sound absorbing properties and result in a more effective thermal barrier at higher temperatures. Low conductivity means that a 6K tow of fibers has a resistance of about $10^7$–$10^4$ ohms. per inch.

In accordance with a third embodiment of the invention, the non-linear carbonaceous or carbon filaments which are utilized in the thermal insulating and/or sound absorbing structures of the invention have a carbon content of at least 85%. Preferably, the filaments which are utilized are derived from stabilized acrylic fibers and have a nitrogen content of less than 10%. As a result of the still higher carbon content, the structures prepared are more electrically conductive. That is, the resistance is less than $10^4$ ohms. per inch. These fibers can be utilized in place of conventional straight or linear carbon fibers. Moreover, the coil-like carbonaceous or carbon filaments when formed into a structure such as a mat or batting, surprisingly provide better insulation against high heat and sound than an equal weight of linear carbon fibers. A structure containing the greater amount of the coil-like fibers than sinusoidal or linear fibers provides the more effective barrier against heat and sound.

DESCRIPTION OF THE PREFERRED EMBODIMENTS

The thermal insulating and/or sound absorbing structures of the invention comprise a batting formed from non-linear non-flammable resilient elongatable carbonaceous fibers having a reversible deflection ratio of greater than about 1.2:1 and an aspect ratio (l/d) of greater than 10:1. The carbonaceous fibers may possess a sinusoidal or a coil-like configuration or a more complicated structural combination of the two.

The fibers of the invention according to the test method of ASTM D 2863-77 have a LOI value greater than 40. The test method is also known as "oxygen index" or "limited oxygen index" (LOI). With this procedure the concentration of oxygen in $O_2/N_2$ mixtures is determined at which the vertically mounted specimenignited at its upper end-just continues to burn. The size of the specimen is 0.65–0.3 cm with a length from 7 to 15 cm. The LOI value is calculated according to the equation:

$$LOI = \frac{[O_2]}{[O_2] + [N_2]} \times 100$$

The LOI value of a number of fibers is as follows:

| | |
|---|---|
| polypropylene | 17.4 |
| polyethylene | 17.4 |
| polystyrene | 18.1 |
| rayon | 18.6 |
| cotton | 20.1 |
| nylon | 20.1 |
| polycarbonate | 22 |
| rigid polyvinyl chloride | 40 |
| oxidized polyacrylonitrile | >40 |
| graphite | 55 |

Such carbonaceous fibers are prepared by heat treating a suitable stabilized precursor material such as that derived from an assembly of stabilized polyacrylonitrile based materials or pitch base (petroleum or coal tar) or other polymeric materials which can be made into a non-linear fiber or filament structures or configurations and are thermally stable.

Figure 1:
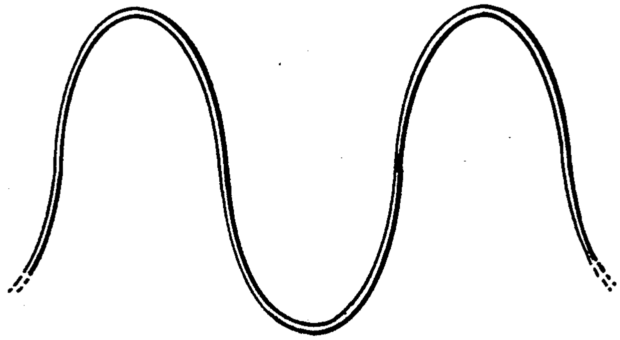
FIG. 1 is a perspective view of a filament of the invention with a sinusoidal configuration.
Figure 2:
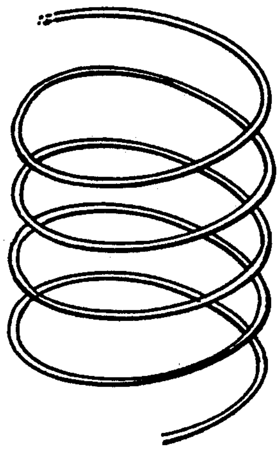
FIG. 2 is a perspective view of a filament of the invention with a coil-like configuration.

For example, in the case of polyacrylonitrile (PAN) based fiber, fibers formed by melt or wet spinning a suitable fluid of the precursor material and having a normal nominal diameter of from about 4 to 25 micrometers, collected as an assembly of a multiplicity of continuous filaments in tows are stabilized (by oxidation in the case of PAN based fibers) in the conventional manner, and the stabilized tows (or staple yarn made from chopped or stretch broken fiber staple) are thereafter, in accordance with the present invention, formed into a coil-like and/or sinusoidal form by knitting the tow or yarn into a fabric or cloth (recognizing that other fabric forming and coil forming methods can be employed). The so-formed knitted fabric or cloth is thereafter heat treated, in a relaxed and unstressed condition, at a temperature of from about 525 to about 750 degrees C., in an inert atmosphere for a period of time to produce a heat induced thermoset reaction wherein additional crosslinking and/or a cross-chain cyclization reaction occurs between the original polymer chain. At the lower temperature range of from about 150 to about 525 degrees C., the fibers are provided with a varying proportion of temporary to permanent set while in the upper range of temperatures of from 525 degrees C. and above, the fibers are provided with a permanent set. What is meant by permanently set is that the fibers possess a degree of irreversability. It is of course to be understood that the fiber or fiber assembly may be initially heat treated at the higher range of temperatures so long as the heat treatment is conducted while the coil-like and/or sinusoidal configuration is in a relaxed or unstressed state and under an inert, non-oxidizing atmosphere. As a result of the higher temperature treatment, a permanently set coil-like (as illustrated in FIG. 2) or sinusoidal (as illustrated in FIG. 2) configuration or structure is imparted to the fibers in yarns, tows or threads. The resulting fibers, tows or yarns having the non-linear structural configuration which are derived by deknitting the cloth, are subjected to other methods of treatment known in the art to create an opening, a procedure in which the yarn, tow or the fibers or filaments of the cloth are separated into a non-linear, entangled, wool-like fluffy material in which the individual fibers retain their coil-like or sinusoidal configuration yielding a fluff or batting-like body of considerable loft.

The fluff or batting of the invention may be utilized alone or may be provided with a suitable barrier layer of flexible sheet material or metal depending upon its desired use.

Figure 3:
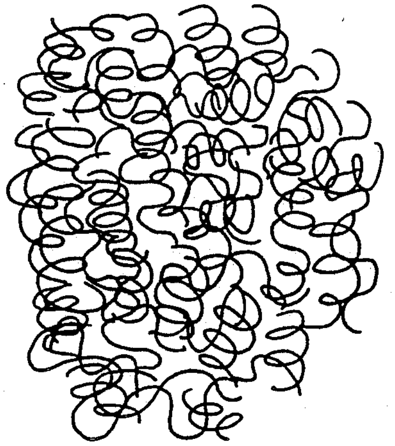
FIG. 3 is an enlarged view of a lightweight non-woven fibrous mat of the invention.

The stabilized fibers when permanently configured in accordance with the present invention into the desired structural configuration (as illustrated in FIG. 3), e.g., by knitting, and thereafter heating at a temperature of greater than about 550 degrees C. retain their resilient and reversible deflection characteristics. It is to be understood that higher temperatures may be employed of up to about 1500 degrees C., but the most flexible and smallest loss of fiber breakage, when carded to produce the fluff, is found in those fibers and/or filaments heat treated to a temperature from about 525 and 750 degrees C.

The carbonaceous material which is utilized in the thermal insulating and sound absorbing structures of the invention may be classified into three groups depending upon the particular use and the environment that the structures in which they are incorporated are placed.

In a first group, the non-flammable non-linear carbonaceous fibers are non-electrically conductive and the fibrous batting may be used in connection with clothing or sleeping blankets because of its excellent washability. In addition, the fibrous batting may be useful as aircraft insulation. The fibers may be blended with other synthetic or natural fibers including cotton, wool, polyester, polyolefin, nylon, rayon, and the like.

In a second group, the non-flammable non-linear carbonaceous fibers are classified as being partially electrically conductive (i.e., having low conductivity) and have a carbon content of less than 85%. When the precursor stabilized fiber is an acrylic fiber, i.e., a polyacrylonitrile based fiber, the percentage nitrogen content is from about 10 to 35%, preferably, from about 20 to 25%. These particular fibers are excellent for use as insulation for aerospace vehicles as well as insulation in areas where public safety is a concern. The structures formed therefrom are lightweight, have low moisture absorbancy, good abrasive strength together with good appearance and handle.

In a third group are the fibers having a carbon content of at least 85%. These fibers, as a result of their high carbon content, have superior thermal insulating and sound absorbing characteristics. The coil-like structure in the form of a fluff (or when carded) provides an insulation which has good compressibility and resiliency while maintaining improved thermal insulating efficiency. The structure prepared with the third group of fibers has particular utility in the insulation of furnaces and in areas of high heat and noise.

The precursor stabilized acrylic filaments which are advantageously utilized in preparing the fibers of the structures are selected from the group consisting of acrylonitrile homopolymers, acrylonitrile copolymers and acrylonitrile terpolymers. The copolymers preferably contain at least about 85 mole percent of acrylonitrile units and up to 15 mole percent of one or more monovinyl units copolymerized with styrene, methylacrylate, methyl methacrylate, vinyl chloride, vinylidene chloride, vinyl pyridine, and the like. Also, the acrylic filaments may comprise terpolymers, preferably, wherein the acrylonitrile units are at least about 85 mole percent.

It is to be further understood that carbonaceous precursor starting materials may have imparted to them an electrically conductive property on the order of that of metallic conductors by heating the fiber fluff or the batting-like shaped material to a temperature above about 1000 degrees C. in a non-oxidizing atmosphere. The electroconductive property may be obtained from selected starting materials such as pitch (petroleum or coal tar), polyacetylene, acrylonitrile based materials, e.g., a polyacrylonitrile copolymer (PANOX or GRAFIL-01), polyphenylene, polyvinylidene chloride resin (SARAN, trademark of The Dow Chemical Company) and the like.

Preferred precursor materials are prepared by melt spinning or wet spinning the precursor materials in a known manner to yield a monofilament fiber tow and the fibers or filaments yarn, tow, woven cloth or fabric or knitted cloth by any of a number of commercially available techniques, heated to a temperature above about 525 degrees C., preferably to above about 550 degrees C. and thereafter deknitting and carding the material to produce the fluff which can be laid up in batting-like form.

The fluff of the invention may be treated with an organic or inorganic binder, needle punched, bagged or adhered to a flexible or rigid support using any of the conventional materials and techniques depending upon the use and environment of the structure. The fluff may be placed on one side of a structure such as a furnace or between structural parts either in the form of a mat or batting.

It is understood that all percentages as herein utilized are based on weight percent.

Exemplary of the present invention are set forth in the following examples:

EXAMPLE 1

A stabilized polyacrylonitrile PANOX (R.K. Textiles) continuous 3K or 6K, hereafter referred to as OPF, tow having nominal single fiber diameters of 12 micrometer, was knit on a flat bed knitting machine into a cloth having from 3 to 4 loops per centimeter. Portions of this cloth were heat set at one of the temperatures set forth in Table I over a 6 hour period. When the cloth was deknitted, it produced a tow which had an elongation or reversible deflection ratio of greater than 2:1. The deknitted tow was cut into various lengths of from 5 to 25 cm., and fed into and opened by a Platts Shirley Analyzer. The fibers of the cut tow were separated by a carding treatment into a wool-like fluff, that is, the resulting product resembled an entangled wool-like mass or fluff in which the fibers had a high interstitial spacing and a high degree of interlocking as a result of the coiled and spring-like configuration of the fibers. The fiber lengths of each such treatment were measured and the results of these measurements set forth in Table 1.

TABLE I

| Run # | Fiber Staple Length (cm) | Heat Treatment degrees C | Stitches/ (cm) | Tow Size |
|---|---|---|---|---|
| 1 | 15 | 550 | 4 | 3K |
| 2 | 5 | 550 | 4 | 3K |
| 3 | 10 | 650 | 3 | 6K |
| 4 | 10 | 950 | 3 | 6K |
| 5 | 20 | 750 | 3 | 6K |
| 6 | 25 | 950 | 4 | 6K |

| Run # | Range of Fiber Lengths (cm) | Length of Majority of Fibers (cm) |
|---|---|---|
| 1 | 3.8-15 | 13-15 |
| 2 | 2.5-5 | 2.5-5 |
| 3 | 5.0-10 | 7.5-10 |
| 4 | 3.8-9.5 | 7.5-9.5 |
| 5 | 7.5-19 | 15.0-19 |
| 6 | 7.5-23 | 19.0-23 |

The aspect ratio of each of the fibers was greater than 10:1 and each possessed a LOI value of greater than 51.

EXAMPLE 2

A series of runs were made to determine the effect various heat treatment temperatures had on the fibers. A significant property was the specific resistivity of the fibers. To determine such property numerous samples of an oxidation stabilized polyacrylonitrile (density 1.35 to 1.39 g/cc) yarn having either 3000 or 6000 filaments per tow, manufactured by RK Textiles of Heaton-Noris, Stockport, England, hereafter referred to as Panox 3K or 6K, respectively, was knitted into a plain jersey flat stock having from 3 to 4 stitches per cm, respectively. The cloth was placed under an oxygen free nitrogen pad in an incremental quartz-tube furnace. The temperature of the furnace was gradually increased from room temperature to about 750 degrees C. over a three hour period with the higher temperatures being achieved by 50 degrees C. increments every 10-15 minutes. The material was held at the desired temperature for about one hour, the furnace opened and allowed to cool while purging with argon. Representative of the furnace temperatures at the above present incremental temperature schedule is that for a 6K yarn and shown in Table II following:

TABLE II

| Time | Temp. Degrees C |
|---|---|
| 0720 | 200 |
| 0810 | 270 |
| 0820 | 300 |
| 0830 | 320 |
| 0840 | 340 |
| 0850 | 360 |
| 0900 | 370 |
| 0905 | 380 |
| 0935 | 420 |
| 0950 | 450 |
| 1005 | 500 |
| 1010 | 550 |
| 1025 | 590 |
| 1035 | 650 |
| 1045 | 600 |
| 1100 | 750 |
| 1400 | 750 |

The specific resistivity of the fibers was calculated from measurements made on each sample using a measured average of six measurements, one made from fibers removed at each corner of the sample and one made from fibers removed from each edge, approximately at the middle of the sample. The results are set forth in Table III following:

TABLE III

| Final Temp. in degrees C | % wt. loss | Log Specific Resistivity Measured in ohm cm |
|---|---|---|
| 500 | — | 4.849 |
| 550 | 33 | — |
| 600 | | 2.010 |
| 650 | 34 | — |
| 750 | 37 | −1.21 |
| 850 | 38 | −2.02 |
| 900 | 42 | −2.54 |
| 950 | 45 | −2.84 |
| 1000 | 48 | −3.026 |
| 1800 | 51 | −3.295 |

All of the above fibers had an LOI greater than 40 and an aspect ratio greater than 10:1.

The analysis of the heat treated fibers was as follows:

| Temperature degrees C | % C | % N | % H |
|---|---|---|---|
| ambient (OPF) | 58.1 | 19.6 | 3.8 |
| 450 | 66.8 | 19.4 | 2.2 |
| 550 | 69.9 | 18.9 | 1.9 |
| 650 | 69.7 | 18.1 | 1.6 |
| 750 | 73.0 | 17.8 | 1.1 |

EXAMPLE 3

A fabric was knitted from a 3K or 6K PANOX OPF (R.K. Textiles) continuous stabilized filament tow on a Singer flat bed knitting machine and heat treated at the temperatures until thermoset set forth in Table IV. The fabric was then deknitted and the spring-like configured tow fed directly into a carding machine. The resulting wool-like mass was collected onto a rotating drum and had sufficient integrity to enable it to be easily handled.

The fiber treated at a temperature of 550 degrees C. is particularly suitable as insulation for clothing such as parkas, sleeping blankets, etc because of its hand. The fluff can also be used to insulate structures for sound and against extreme temperature.

The fiber treated at a temperature of 550 degrees C. and the fiber treated at a temperature of 650 degrees C. can be used as insulation for aerospace vehicles including airplanes.

In Table IV, the length of the fibers ranges from2 to 15 cm. The wool-like mass treated at a temperature of 950 degrees C. was highly conductive and had a resistance of less than 75 ohms. at any probe length taken at widely separated distances (up to 60 cm.) in the wool-like mass. The fibers were suitable for use as insulation for engines to absorb noise.

TABLE IV

| Run # | Fiber Staple Length (cm) | Heat Treatment degrees C | Stitches/cm |
|---|---|---|---|
| 1 | 7.5 | 550 | 4 |
| 2 | 10 | 650 | 3 |
| 3 | 15 | 650 | 3 |
| 4 | 20 | 950 | 3 |
| 5 | 25 | 950 | 3 |

Range of Fibers

TABLE IV-continued

| Run # | Tow Size | Lengths (cm) |
|---|---|---|
| 1 | 3K | 2.5–7.5 |
| 2 | 6K | 2.5–10 |
| 3 | 6K | 2.5–13.3 |
| 4 | 6k | 2–15.0 |
| 5 | 6K | 2–12.5 |

The experiment illustrates that the higher temperature heating result in shrinkage of the fibers.

EXAMPLE 4

A 3K OPF (i.e., 3000 filaments) PANOX stabilized tow was knit on a Singer flat bed knitting machine at a rate of 4 stitches/cm an was then heat treated at a temperature of 950 degrees C. The cloth was deknitted and the tow (which had a coil elongation or reversible deflection ratio of greater than 2:1) was cut into 7.5 cm lengths. The cut yarn was then carded on a Platt Miniature carding machine to produce a wool-like fluff having fibers ranging from 2.5 to 6.5 cm. in length. The wool-like fluff had a high electrical conductivity (a resistance less than $10^4$ ohms. per inch) over any length of up to 60 cm tested.

In lieu of PANOX, there may be employed stabilized pitch based fibers or a copolymer or terpolymer of polyacrylonitrile.

EXAMPLE 5

In a similar manner to Example 4, a portion from the same knit sock was heat treated at a temperature of 1550 degrees C. The cloth itself and the deknitted tow had a very high electrical conductivity. On carding 15 cm. lengths of out tow, a fluff containing fibers was obtained which had fiber lengths of 2.54 to 9.5 cm. (1 to 3 inches) with average lengths of 5 cm. (2 inches). Thus, carding of a deknitted continuous filament tow knitted fabric which has been subjected to a temperature of above 1000 degrees C. is still capable of producing a wool-like fluff product.

EXAMPLE 6

The material of Example 3 which had been heat treated to 550 degrees C. until thermoset and possessed no electrical conductivity was fabricated into a thermal jacket employing about 5 ounces (0.14 kg.) of the fluff as the sole fill of the jacket. The jacket had an insulating effect similar to that of a down jacket having 15–25 ounces (0.42 - 0.71 kg.) of down as the insulating fill. If desired, the fibers may be blended with other synthetic fibers such as nylon, rayon or polyester.

EXAMPLE 7

A 3K OPF tow was knit into a sock, the sock treated at 525 degrees C. until it was thermally set and thereafter deknit and cut into about 7 1/2 inch (17.78 –19.05 cm.) nominal lengths. The so cut yarns were opened on a Shirley opener then further processed on a Rando Webber machine, an air laying system for producing nonwoven batting. The feed plate-combing roll were spaced at 12/1000 inch and dispersed into the chamber using a 1200 rpm. setting on the fan. A small amount of low melting fibers of ethylene acrylic acid copolymer (manufactured from PRIMACOR 440 resin produced by The Dow Chemical Company), were blended with the cut treated OPF tow fibers as it was fed into the Shirley. The resulting batting was passed through a Benz hot air oven held at a temperature of 260 degrees C. at a rate of 2 m/min resulting in an oven time of about 1 minute. This was sufficient to melt the ethylene acrylic acid copolymer to achieve a light bonding of the carbonaceous fibers in the web.

EXAMPLE 8

In a similar manner described in Example 7, the cut fibers were treated in a Shirley opener and then a Rando Webber air laying system, but without the low melting polyethylene acrylic acid added. The resulting batting was processed on a Hunter Fiber Locker to obtain a mechanical bonding by the needle punching process. The resulting structure was suitable as a sound absorbing mat for use under a synthetic fiber carpet.

EXAMPLE 9

To establish the heat conductivity of the carbon fibers per se two samples of a fluff prepared in the manner of Example 6, 8×8 inches square (20.32 × 20.32 cm. square) and about 3 inches (7.62 cm.) high, one, Sample 1, weighing about 43 grams and the other, Sample 2, about 52 grams were compressed to 1.15 and 0.85 inches (2.92 and 2.16 cm.), respectively, and the R-value and the K-value were measured using ASTM-C-518 method with a 100 degrees F. (38 degrees C.) hotplate and a 50 degrees F. (10 degrees C.) cold plate. The results were as follows:

| Sample | Compressed Thickness (in.) | R-Value Hr-ft2 degrees F/BTU | K-Value BTU/Hr-ft2-degrees |
|---|---|---|---|
| 1 | 1.15 | 4.11 | 0.28 |
| 2 | 0.85 | 4.03 | 0.21 |

Sample 1 had been heat treated to 950 degrees C. and Sample 2 had been heated to a temperature of 550 degrees C.

EXAMPLE 10

In a similar process as described in Example 9, 6K OPF was knit, heat treated to about 550 degrees C., deknit and the tow cut into 6" (15.24 cm) to 10' (25.4 cm.) lengths which were passed through the full production size Shirley and collected. A portion of this run was used in insulating aircraft.

EXAMPLE 11

Figure 4:
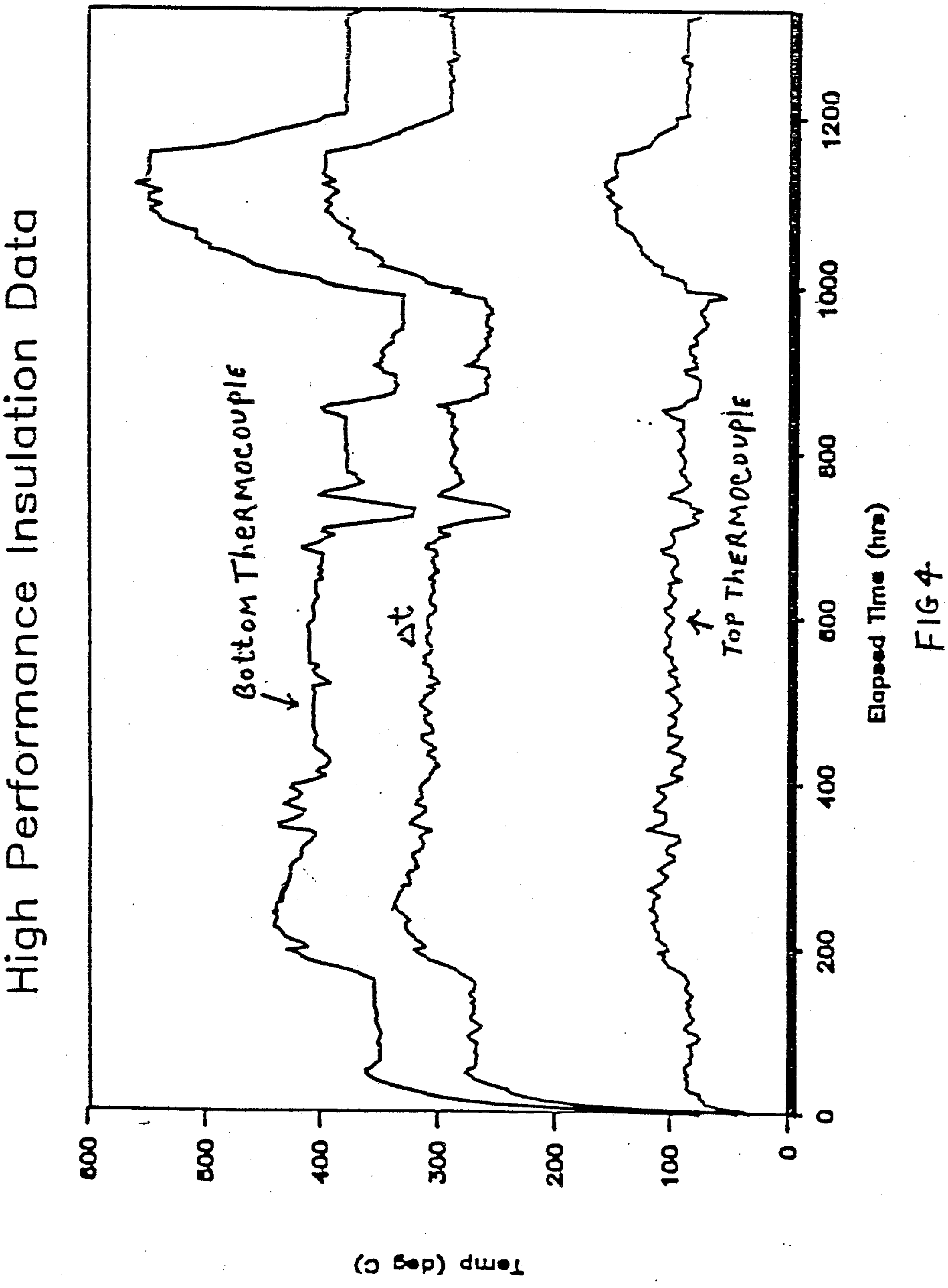
FIG. 4 is a graph of the heat insulating properties of a fluff of the invention as an insulation for furnaces.

In another experiment an electrical furnace was insulated on the top section above the heater box with a fluff prepared in Example 10, as an eight inch (20.32 cm.) blanket covering an area of about 54 inches (139.16 cm.) by 52½ (133.35 cm.) inches, the area above the heater box of the furnace. The fluff weighed 60 grams per cubic foot (2.143 kg/m$^3$). The insulating quality of this fluff was measured across six inches (15.24 cm.) of the blanket by placing two thermocouples in the fluff, one an inch 2.54 cm.) above the furnace heater and the other one inch below the upper extent of the fluff, to insure that surface effect was eliminated. The temperature profile of the two thermocouples, as well as the difference between the two thermocouples is shown in FIG. 4 wherein it is illustrated that the blanket provided a temperature drop of about 350 degrees C. from the wall of the furnace to the exterior cover of the furnace. Previously the furnace required about 8 inches (20.32 cm.) of carbon black insulation to obtain the same temperature drop. The carbon black insulation weighed about 30 pounds per cubic foot (480 kg./$m^3$).

EXAMPLE 12

The noise level of a Mooney single engine plane Model 20 C. (manufactured by Mooney Aviation, Kerville, TX) was measured using a sound source abutting the outside skin panel which forms the outside wall of the luggage compartment of the plane. A sound measuring meter was placed inside the plane 6 inches (15.24 cm.) from the inside skin of the plane. Measurement taken using several frequencies are set forth below:

| Frequency Hz | Inside Decibels* | Inside Decibels** | Inside Decibels*** |
|---|---|---|---|
| 250 | 77 | 59 | 53 |
| 500 | 79 | 63 | 49 |
| 1000 | 72 | 69 | 57 |
| 2000 | 86 | 69 | 51 |

*No insulation
**Standard lead/vinyl/fiberglass
***Present invention

The plane had its original insulation package which consisted of 16.02 kg/$m^3$ of standard fiberglass having a thickness of 2.5 cm. backed by aluminum foil. The original insulation package behind the panels of the interior of the plan weighted approximately 10kg. The thermal resistance or R value was about 3½ to 4. The new package is described in the table below. The total insulating area was approximately 7.5 $m^2$ The size of the top and luggage area consisted of 5.3 $m^2$ and this was insulated with about 5 kg. of the package of the invention. The package was made up by cutting some of the 3.2 to 3.8 cm. polyester bonded carbonaceous fiber containing 23 percent polyester binder fiber which had been manufactured into a nonwoven batting with the use of a Rando Webber. The insulation was laminated by using aircraft approved glue to a sheet of hard, heavy grade aluminum foil and each section of insulation was bagged in a Mylar FAA approved reinforced film bag with the side to the interior of the plane containing some fiberglass screening to allow for breathing of the insulation. The floor area of the plane was 1.2$m^2$. This was insulated with 0.85 kg. of the bagged fiber/aluminum/fiber composite structure. The material used for the floor area was a densified latex bonded carbonaceous fiber batting which was laminated to aluminum foil and placed in a similar Mylar bag with the screen side. The total weight of the insulation laminate packaged including the numerous bags was 5.5 kg. Of this, there was approximately 2 kg. of the actually fiber material of the invention, the rest of the weight was made of the aluminum foil and Mylar packing. The thermal resistivity or R value of the polyester bonded fluff was about 7.3 which is about double the value of the original insulation material used.

A current state of the art sound/thermal insulation package consists of sound board, microlite fiberglass and leaded vinyl sheeting. The total weight of standard insulation package for the interior area excluding floor area was 25kg. and on the floor would be another 2kg. for a total package weight of 27kg. The weight savings of carbonaceous batting versus the standard package which would have similar R values of about 6 to 7 to the package of the invention that was used would show that the carbonaceous fibers weighted only 22 percent as much as the standard package.

Sound measurements were taken on the aircraft at 1500 m. cruise altitude standard engine settings with the original insulation and after the new insulation package was installed. The results are shown in the following table. In the speech interference level of 500 to 2000 Hz., the sound value of the original aircraft was 93.3 dB. After insulation with the new package the speech interference level value dropped to 83 dB (recall for every 3 dB drop the sound level halves), so that this contributes more than an 8 fold reduction of the speech interference noise level at the pilot's ear level. These measurements were made with the old interior of the plane just fitted loosely back in for the purpose of test flight. A new fitted interior was placed in the aircraft and the sound measurements once again measured at the 1500m. level. The speech interference level at the pilot's ear level dropped down to 79.7dB and at 2850m cruise dropped even further to a lower value of 78.9dB. Comparative Data:

| | Orig. FG | Insulation Structure of Invention | Standard Insulation Structure |
|---|---|---|---|
| Weight (kg) | 10 | 5.5 | 27 |
| Thermal (R) | 4 | 8 | 8 |
| Sound (SILA) (dB) | 93.5 | 83 | 86-87 |

SILA = Speech Interference Level 500 + 1K + 2K/3

The study demonstrates that the sound attenuation and dampening characteristics with the carbonaceous fiber-aluminum foil-carbonaceous fiber laminated package of the invention was an improvement over the convention fiberglass/lead vinyl package of the prior art where the lead vinyl is used to dampen sound especially at lower frequencies (less than 1000Hz.).

EXAMPLE 13

Similar to Example 12, a Falcon 50 S/N 51 airplane having as original insulation 5 cm. of microlite fiberglass (FG) having a density of 9.6 kg/$m^3$ was replaced with 10cm. carbonaceous batting of the invention. The results were as follows:

| | Orig. FG | Invention | Standard FG Package |
|---|---|---|---|
| Weight (kg) | 67 | 58 | 110 |
| Batting Thickness (cm) | 5 | 10 | 10 |
| Thermal (R) | 7 | 14 | 14 |
| Sound (SILA) (dB) | 60.5 | 57 | 61 |

SILA = Speech Interference Level 1K + 2K + 4K/3

EXAMPLE 14

A. Carbonaceous filaments from a rayon precursor.

A 300 denier and a 1650 denier rayon continuous tow yarn was knitted into approximately two (2) inch (about 2.5 cm.) diameter socks on a single end jersey-style circular knitting machine, were cut into four short sections. Three such sections from the sock knit from the 300 denier yarn tow were introduced, one at a time, into a tube furnace. In each instance the furnace was closed and purged with nitrogen for fifteen (15) minutes. Thereafter the furnace temperature was slowly raised for the first sock section to 370 degrees C. over a one and one half (1½) hour period, for the second sock section to 550 degrees C. over a one and three quarter (1¾) hour period, and for the third sock section to 1050 degrees C. over a one and one quarter (1¼) hour period, respectively.

Each section taken from the furnace was black in color. The first section which had been heated to 370 degrees C., was very flexible, was substantially electrically nonconductive, the yarn tow was capable of careful hand deknitting, the deknit tow was of a sinusoidal configuration, the tow was capable of elongation to a straight length with little breakage of the individual fibers and the tow lost its sinusoidal configuration when heat was applied by blowing hot air from the heat gun (a hair dryer) thus indicating the "set" (sinusoidal or coilure configuration of the tow) was only temporary. Only minimal weight loss was observed as a result of the heat treatment procedure.

The second section which had been heated to 550 degrees C., was moderately flexible, was substantially electrically conductive having an electrical resistivity of $7\times10^9$ ohms. per square, the tow was capable of careful hand deknitting but broke into short lengths of about 2.5 to 5 cm., the said pieces of deknit tow had a sinusoidal configuration but such pieces were not capable of reversible full elongation without breaking, that is the individual fibers of the deknit tow broke into short pieces even when the most gentle attempts were made to elongate the sinusoidal configuration of the tow to anything approaching a straight configuration.

While the tow length of about 2.5 to 5cm. did not appear to lose their sinusoidal configuration when heat was applied, the fibers broke due to the force of the air from the heat gun. The yarn strands comprised of the bundle of short fibers were brittle and it was impossible, even when the most gentle conditions of handling were used, to separate the individual fibers of lengths greater than about 1 cm. or less.

The third section, which had been heated to 1050 degrees C., was even less flexible than the previous section. It had lost over 75% of its original dry weight, resulting is a marked decrease of fiber diameter, and was substantially electrically conductive having an electrical resistivity of 70 ohms. per square. A tow was not capable of being drawn from the knit fabric in its knitted state after heating, even by careful hand deknitting. The fibers broke into short lengths as the tow was drawn from the fabric. On attempting to deknit the latter fabric, bundles of fibers of less than ½ inch (1.25 cm.) long having a sinusoidal configuration, were not capable of elongation since the individual fibers broke into even smaller pieces. B. Carbonaceous filaments according to the invention The procedure of Part A was followed except that in lieu of rayon the sock was prepared from an oxidation stabilized polyacrylonitrile (PAN) fiber (3000 count filaments).

The section heated to 1000 degrees C., had a weight loss of 46.5% and a 5 cm. length of the deknit tow had a resistance of 48 ohms.

A 2.5×5cm. section of the sock after heating to 1500 degrees C. had before deknitting a resistance of 1.9 ohms. and a stretched section of a deknit tow 2.5 cm. long had a resistance of 2.9 ohms. C.

Following the procedure of Part B, similar oxidation stabilized acrylonitrile based (PANOX) (6000 count filaments) tow knit fabrics which were heated to 372 degrees C. and 564 degrees C. respectively. The portion which had been heat treated to 564 degrees C. lost 31% of its weight and had a resistance, with respect to the cloth, of 1×106 ohm. per square. A tow drawn from the fabric had a resistance of 400K ohms. per cm.

The material which had been heat treated to 372 degrees C. lost about 31% of its original weight and had an electrical resistance of greater than about $1\times10^{12}$ ohm. per square.

The experiments show that it is evident that the nature of the precursor material, the oxidation stabilized polyacrylonitrile based material, provides properties which the rayon precursor does not provide when subjected to the same treatment.

EXAMPLE 15

Non-Flammability Test

The non-flammability of the fibers of the invention has been determined following the test procedure set forth in 14 CFR 25.853(b), which is herewith incorporated by reference. The test was performed as follows:

A minimum of three 1"×6"×6"(2.54 cm. × 15.24 cm×15.24 cm.) specimens were conditioned by maintaining the specimens in a conditioning room maintained at 70 degrees ±5 degrees F. temperature and 50% ±5% relative humidity for 24 hours preceding the test.

Each specimen was supported vertically and exposed to a Bunsen or Turill burner with a nominal I.D. tube adjusted to give a flame of 1½inches (3.81 cm.) in height by a calibrated thermocouple pyrometer in the center of the flame was 1550 degrees F. The lower edge of the specimen was ¾inch (1.91 cm.) above the top edge of the burner. The flame was applied to the center line of the lower edge of the specimens for 12 seconds and then removed.

Pursuant to the test, the material was self-extinguishing. The average burn length did not exceed 8 inches (20.32 cm.). The average after flame did not exceed 15 seconds and no flaming drippings were observed.

Surprisingly, the fibers of the invention all had an LOI of greater than 40.

What is claimed is:

1. A thermal insulating and/or sound absorbing structure comprising a batting of resilient elongatable, nonlinear, non-flammable, carbonaceous fibers, said fibers having a reversible deflection ratio of greater than 1.2:1, an aspect ratio greater than 10:1 and a limited oxygen index value greater than 40.

2. The structure of claim 1 comprising fibers having a sinusoidal configuration.

3. The structure of claim 1 comprising fibers having a coil-like configuration.

4. The structure of claim 1 comprising non-electrically conductive fibers having a resistance of greater than $10^7$ ohms. per inch when measured on a 6K tow having a diameter of 7–12 microns.

5. The structure of claim 4 wherein said fibers have a bulk density of less than about 8 kg/m $_3$.

6. The structure of claim 1 wherein said fibers are electrically conductive fibers having a specific resistivity less than 1.2 ohm. cm.

7. The structure of claim 6 comprising fibers having a carbon content of less than 85%.

8. The structure of claim 6, wherein said fibers contain a binder.

9. The structure of claim 8 wherein said fibers have a carbon content of at least 85%.

10. The structure of claim 1 wherein said fibers are derived from stabilized acrylic fibers and said carbonaceous fibers have a percent nitrogen content of from about 10 to 35%.

11. The structure of claim 10 wherein said carbonaceous fibers have a nitrogen content of about 20% to 25%.

12. A thermal and/or sound absorbing structure comprising a batting of resilient elongatable non-linear non-flammable carbonaceous fibers, said fibers having a reversible deflection ratio of greater than 1.2:1 an aspect ratio greater than 10:1, and are non-electrically conductive having a resistance of greater than $10^7$ ohms. per inch when measured on a 6K tow having a diameter of 7–12 microns.

13. The structure of claim 12, wherein said fibers have a bulk density of less than about 32 kg/m3.

14. The structure of claim 12, wherein said fibers are derived from stabilized polyacrylonitrile.

15. The structure of claim 12 wherein said batting comprises coil-like carbonaceous fibers.

16. The structure of claim 15 wherein said batting comprises sinusoidal carbonaceous fibers.

17. A thermal and/or sound absorbing structure comprising a batting of resilient electrically conductive fibers having a specific resistivity less than 1.2 ohm. cm. elongatable non-linear non-flammable carbonaceous fibers, said fibers having a reversible deflection ratio of greater than 1.2:1, an aspect ratio of greater than 10:1 and a carbon content of at least 85%.

18. The structure of claim 17 wherein said fibers are derived from stabilized polyacrylonitrile and have a nitrogen content of about 10 to 35%.

19. The structure of claim 18 wherein fibers have a nitrogen content of about 20 to 25%.

20. The structure of claim 17 wherein said batting comprises coil-like carbonaceous fibers.

21. The structure of claim 17 wherein said batting comprises sinusoidal carbonaceous fibers.

22. A thermal and/or sound absorbing structure comprising a batting of resilient electrically conductive fibers having a specific resistivity less than 1.2 ohm. cm., elongatable non-linear non-flammable carbonaceous fibers, said fibers having a reversible deflection ratio of greater than 1.2:1, an aspect ratio of greater than 10:1 and a carbon content of at least 85%.

23. The structure of claim 22 wherein said batting comprises coil-like carbonaceous fibers.

24. The structure of claim 22 wherein said batting comprises sinusoidal carbonaceous fibers.

25. The structure of claim 22 wherein said structure has a bulk density of less than about 32 kg/m3.

26. In an airplane having insulation, the improvement comprising said insulation being composed of the structure of claim 1.

* * * * *

UNITED STATES PATENT AND TRADEMARK OFFICE
CERTIFICATE OF CORRECTION

PATENT NO. : 4,898,783

DATED : February 6, 1990

INVENTOR(S) : Francis P. McCullough, et al.

It is certified that error appears in the above-identified patent and that said Letters Patent is hereby corrected as shown below:

Cover page, third line of Inventors; change "Midland; R. Vernon Snelgrove," should read --Midland, Michigan; R. Vernon Snelgrove,--

Cover page, under FOREIGN PATENT DOCUMENTS; change "8605110" to read --8606110--.

Column 1, line 48; change "down an" to read --down and--.

Column 8, line 52; change "from2" to read --from 2--.

Column 8, line 69; delete black arrow from page.

Column 9, line 34; change "of out tow" to read --of cut tow--.

Column 10, line 44; change "to 10 " to read --to 10"--.

Column 12, line 17; change "79.7dB" to read --79.7 dB--.

Column 12, line 17; change "2850m" to read --2850 m--.

Column 13, line 52; return after the word pieces.

Column 13, line 61; change "2.5×5cm." to read --2.5×5 cm--.

Column 14, line 59; change "8kg/" to read --8Kg/--.

Signed and Sealed this

Twenty-fourth Day of September, 1991

*Attest:*

HARRY F. MANBECK, JR.

*Attesting Officer*

*Commissioner of Patents and Trademarks*